(12) United States Patent
Muller et al.

(10) Patent No.: US 9,847,644 B2
(45) Date of Patent: Dec. 19, 2017

(54) SYSTEMS AND METHODS FOR DEMAND RESPONSE AND DISTRIBUTED ENERGY RESOURCE MANAGEMENT

(75) Inventors: Nelson Muller, Plymouth, MN (US); Ilya Roytelman, Plymouth, MN (US); Jose Medina, Minneapolis, MN (US); Ali Ipakchi, San Carlos, CA (US); Farrokh Albuyeh, San Carlos, CA (US); Farrokh Rahimi, Redwood City, CA (US); Mathew Hink, Ramsey, MN (US); Sasan Mokhtari, Eden Prairie, MN (US)

(73) Assignee: OPEN ACCESS TECHNOLOGY INTERNATIONAL, INC., Minneapolis, MN (US)

( * ) Notice: Subject to any disclaimer, the term of this patent is extended or adjusted under 35 U.S.C. 154(b) by 163 days.

(21) Appl. No.: 13/024,158

(22) Filed: Feb. 9, 2011

(65) Prior Publication Data

US 2011/0196546 A1    Aug. 11, 2011

Related U.S. Application Data

(60) Provisional application No. 61/302,691, filed on Feb. 9, 2010.

(51) Int. Cl.
  *G05B 15/02*  (2006.01)
  *H02J 3/38*   (2006.01)

(52) U.S. Cl.
  CPC ............ *H02J 3/383* (2013.01); *H02J 3/386* (2013.01); *Y02E 10/563* (2013.01); *Y02E 10/763* (2013.01)

(58) Field of Classification Search
  USPC .................................................. 700/291, 295
  See application file for complete search history.

(56) References Cited

U.S. PATENT DOCUMENTS

| 7,844,370 B2 | 11/2010 | Pollack et al. |
| 8,234,876 B2 * | 8/2012 | Parsonnet ............ F24F 5/0017 62/436 |
| 2009/0077397 A1 | 3/2009 | Shnekendorf et al. |

OTHER PUBLICATIONS

Piette, Mary Ann, "Open Automated Demand Response Communications Specification (Version 1.0)", Lawrence Berkeley National Laboratory, May 4, 2009.*
Kumar et al., "DG Integrated Approach for Service Restoration Under Cold Load Pickup", IEEE 2009.*
Huang et al., "A Model Reference Adaptive Control Strategy for Interruptible Load Management," IEEE Transactions on Power Systems, vol. 19, No. 1, Feb. 2004, pp. 683-689.

(Continued)

*Primary Examiner* — Carlos Ortiz Rodriguez
(74) *Attorney, Agent, or Firm* — Vidas Arrett & Steinkraus

(57) ABSTRACT

Techniques are described for incorporating distribution network analysis in the demand response scheduling process. In one example, a method includes receiving demand response (DR) request from a DR initiator, transmitting the DR request to an aggregator, for each customer, receiving customer location information and a customer DR value from the aggregator, aggregating DR at a distribution transformer in a distribution system, determining if there are any violations in the distribution system, determining an aggregated DR value for each electric node affected by the DR request, and transmitting each determined DR value to the DR initiator.

19 Claims, 8 Drawing Sheets

(56) References Cited

OTHER PUBLICATIONS

Ramanathan et al., "A Framework for Evaluation of Advanced Direct Load Control With Minimum Disruption," IEEE Transactions on Power Systems, vol. 23, No. 4, Nov. 2008, pp. 1681-1688.
Ruiz et al., "A Direct Load Control Model for Virtual Power Plant Management," IEEE Transactions on Power Systems, vol. 24, No. 2, May 2009, pp. 959-966.
Ashok et al., "An Optimization Mode for Industrial Load Management," IEEE Transactions on Power Systems, vol. 16, No. 4, Nov. 2001, pp. 879-884.
Navid-Azarbaijani et al., "Realizing Load Reduction Functions by Aperiodic Switching of Load Groups," IEEE Transactions on Power Systems, vol. 11, No. 2, May 1996, pp. 721-727.
Markushevich et al., "Integrated Voltage, Var Control and Demand Response in Distribution Systems," Power Systems Conference and Exposition, Mar. 2009, IEEE/PES, pp. 1-4.
National Institute of Standards and Technology, U.S. Department of Commerce; NIST Special Publication 1108; "NIST Framework and Roadmap for Smart Grid Interoperability Standards, Release 1.0" Jan. 2010, pp. 1-145.
Canbolat Ucak et al., "An Analytical Approach for Step-By-Step Restoration of Distribution Systems Following Extended Outages," IEEE Transactions on Power Delivery, vol. 9, No. 3, Jul. 1994, pp. 1717-1723.
Medina et al., "Demand Response and Distribution Grid Operations: Opportunities and Challenges," IEEE Transactions on Smart Grid, vol. 1, No. 2, Sep. 2010, pp. 193-198.

\* cited by examiner

SYSTEMS AND METHODS FOR DEMAND RESPONSE AND DISTRIBUTED ENERGY RESOURCE MANAGEMENT

This application claims the benefit of U.S. Provisional Application No. 61/302,691, filed Feb. 9, 2010, the entire content of which is incorporated herein by reference.

TECHNICAL FIELD

This disclosure relates generally to electric power and, more particularly, to smart grids.

BACKGROUND

Electric utilities are able to manage load conditions using various tools at their disposal. For example, a customer of the electric utility may have enrolled in a plan that allows the utility, for example, to temporarily shut off or otherwise adjust customer equipment via one or more demand response (DR) devices. Allowing the utility to shut off or adjust settings on customer equipment during periods of high demand allows the utility to manage system-wide consumption in response to supply conditions. For example, during hot summer days, a utility may turn off one or more air conditioning units on one or more feeders in order to shed load on those feeders. A utility may turn off those air conditioning units for a number of reasons, including, for example, a downed transmission line, a spike in the price of electricity, or the failure of equipment, e.g., a substation transformer.

In addition to turning off or adjusting customer equipment in order to shed load, electric utilities may also request customers enrolled in a plan to generate electricity to supplement the electricity on the electric grid via distributed energy resources (DER). For example, an electric utility may ask a customer enrolled in such a plan to turn on a diesel generator to produce electricity that is sold to the electric utility.

SUMMARY

In general, this disclosure is directed toward controllable demand response (DR) and distributed energy resources (DER) management systems and methods that integrate DR with distribution grid topology. Using the controllable DR management systems and methods described in this disclosure, DR is integrated with distribution grid topology, which allows transmission and distribution operators to consider the impact of DR in the distribution grid and to determine DR availability at the transmission nodes and distribution feeders.

In one example, this disclosure is directed to a method comprising receiving demand response (DR) request from a DR initiator, transmitting the DR request to an aggregator, for each customer, receiving customer location information and a customer DR value from the aggregator, aggregating DR at a distribution transformer in a distribution system, determining if there are any violations in the distribution system, determining an aggregated DR value for each electric node affected by the DR request, and transmitting each determined DR value to the DR initiator In another example, this disclosure is directed to a computer-readable storage medium comprising instructions that, when executed by a processor, cause the processor to receive demand response (DR) request from a DR initiator, transmit the DR request to an aggregator, for each customer, receive customer location information and a customer DR value from the aggregator, aggregate DR at a distribution transformer in a distribution system, determine if there are any violations in the distribution system, determine an aggregated DR value for each electric node affected by the DR request, and transmit each determined DR value to the DR initiator.

In another example, this disclosure is directed to a system comprising means for receiving demand response (DR) request from a DR initiator, means for transmitting the DR request to an aggregator, for each customer, means for receiving customer location information and a customer DR value from the aggregator, means for aggregating DR at a distribution transformer in a distribution system, means for determining if there are any violations in the distribution system, means for determining an aggregated DR value for each electric node affected by the DR request, and means for transmitting each determined DR value to the DR initiator.

The details of one or more aspects of the disclosure are set forth in the accompanying drawings and the description below. Other features, objects, and advantages will be apparent from the description and drawings, and from the claims.

DETAILED DESCRIPTION

Figure 1:
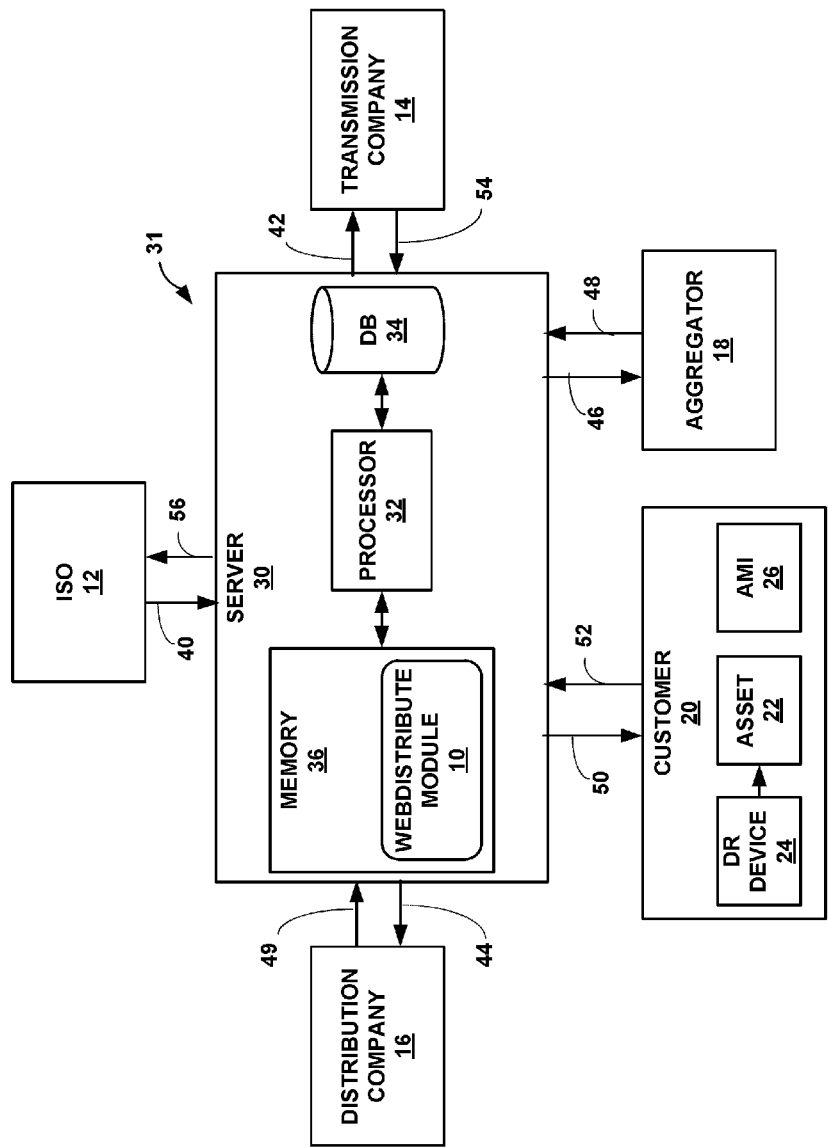
FIG. 1 is a diagram illustrating one example system that implements management of information flow, in accordance with this disclosure.

In general, this disclosure is directed to systems and methods that provide a closed-loop integrated information process framework and a set of applications for demand response (DR) and distributed energy resource (DER) management. The systems and methods are referred to generally as "webDistribute" through this disclosure. Using the techniques of this disclosure, every stakeholder with a vested interest in DR and DER initiation, monitoring, or outcome, is an active participant and/or decision maker in the information process. Whether the stakeholder's interest is financial, environmental or the reliable operation of the electric grid, the webDistribute integrated information process is a technology enabler for these parties to interact and work on consistent information set and make decisions that best fit their business interests.

In addition, this disclosure is directed to systems and methods that integrate controllable DR, such as notification, direct load control and price based DR, and DER with distribution grid topology. Dispatchable DR management is the process of controlling end-use customers (load) from their normal consumption pattern with the objective of decreasing power (energy) demand during peak hours when energy generation is expensive, shifting demand to off-peak times, or balancing demand through load shedding at times of generation deficit. Using the dispatchable DR management systems and methods described in this disclosure, DR is integrated with distribution grid topology, which allows transmission and distribution operators to consider the impact of DR in the distribution grid and to determine DR availability at the transmission nodes. The result of the proposed DR topological aggregation is the true value of the demand decrease calculated per substation and feeder. The DR values per electric node, e.g., substation, substation busbar, feeder, lateral, and the like, are reported back to ISO/RTO or Distribution System Operator (DSO), used for scheduling, and serve as targets for DR real-time monitoring. DR values aggregated per feeder/phase or any other grid element are available to the distribution system operators and are used to prevent possible violations such as load pickup before and after a DR event, lack of coordination between DR and distribution grid Volt/VAR control, and asymmetric DR balancing between phases.

In terms of organization, this disclosure first describes the webDistribute module. The disclosure then describes the various submodules that form the webDistribute module, including the distribution grid module, which, in accordance with various techniques of this disclosure, is responsible for network topology management, and assessment of DR/DER operations/schedules against network constraints and capabilities. Finally, the disclosure describes the distribution grid module in detail.

webDistribute is an integrated solution for initiation, scheduling and dispatch of DR and DER resources. Reliability operating entities, such as Transmission and Distribution System Operators (DSO), Regional Transmission Operators (RTO) and Independent System Operators (ISO), may initiate or request DR from DR-subscribers through webDistribute on the entire regional electric footprint, on specific zones of the footprint, on distribution supply substations, or on selective feeders, due to reliability or adequacy concerns on the Bulk Electric System or specific feeders thermal limit violations on certain electric devices.

The DR request is distributed through webDistribute to Resource Aggregators with a financial interest in providing DR that meets the requested demand reduction or increase on the requestor's specified locations from customers (resources) at the lowest possible cost, that also enforces contractual obligations with their customers, such as maximum number of hours the resource can respond to DR in a year, or maximum number of times a resource can respond to DR in a year.

The Resource Aggregators notify the Reliability Operating entities, via webDistribute, of their resource selections and expected DR contributions from the resources. DSOs use the information to validate and approve the DR amounts from the requestor and the resource selections from the Resource Aggregators using webDistribute application tools, and other analysis tools and systems available to the DSOs.

Upon approval and denial, the DSOs notify the DR requestor, via webDistribute, of the expected demand adjustment for the entire DR request, and the amounts that should be expected at each distribution substation and/or distribution feeder on distribution system. webDistribute closed-loop information framework enables the requestor to monitor the DR provided in each substation, and provides information that allows the requestor to adjust the DR request amount (increase or reduce) based on expected DR results and actual DR provided, and reinitiate the cycle once more.

webDistribute supports various price-based, notification-based and direct control-based retail DR programs and enables Resource Aggregators to bring resources to the wholesale energy, capacity and ancillary services (Regulation and Reserve) products. webDistribute offers the flexibility and scalability needed to address small to large system deployments from a few thousand DR/DER resources to the needs of utilities with several million customers. webDistribute provides, among other things, interfaces with utility advanced metering infrastructure (AMI), field communications, operations and enterprise systems to leverage available data and functional capabilities of customer's available field devices and communications infrastructure and existing information systems. The above list of interfaces provided by webDistribute should be considered non-exhaustive.

FIG. 1 is a diagram illustrating one example of management of information flow by webDistribute, in accordance with this disclosure. As seen in FIG. 1, webDistribute module 10 (also referred to as "webDistribute 10") communicates with various external electric system entities, including ISO 12, transmission company 14, distribution company 16 (also referred to in this disclosure as a DSO), aggregator 18, and customer 20. webDistribute interfaces with a utility's operations and enterprise systems for collection and synchronization of customer data, network topology and operating data, geographic information, metering data, and energy transaction schedules.

In FIG. 1, ISO 12, e.g., Midwest ISO or other wholesale energy market participant, utilizes energy management system tools (EMS), e.g., supervisory control and data acquisition (SCADA) equipment, to monitor substation loads at the very high voltages associated with wholesale energy markets. Transmission company 14, e.g., Great Rivers Energy, monitors transmission substations loads and the interfaces to distribution company 16 using EMS equipment.

Distribution company 16 monitors load on the feeders on its system using distribution management system (DMS) equipment and techniques. Aggregator 18, which in some examples is the same as distribution company 16, provides DR contracts with customer 20. Aggregator 18 determines which customers enrolled in DR plans will provide a reduction in energy consumption if there is a DR request from ISO 12, transmission company 14, or distribution company 16.

Customer 20 enrolled in a DR plan has one or more assets 22, e.g., air conditioners, water heaters, smart appliances, generators, and the like. Each asset 22 that is covered by the DR plan (or a DER plan in the case of generators) is in communication with a DR device 24. In addition, customer 20 has smart metering equipment AMI 26 that provides energy information on a frequent basis, e.g., every fifteen minutes. Although FIG. 1 only depicts a single customer 20 for simplicity, in reality there are numerous customers 20 with each customer 20 having one or more assets 22 arranged in various configurations.

As seen in FIG. 1, each of ISO 12, transmission company 14, distribution company 16, aggregator 18, and customer 20 is in communication with webDistribute 10 via communication infrastructure such as, but not limited to, cellular communication systems, radiofrequency (RF) communication systems, and Internet communication systems. Using the techniques of this disclosure, webDistribute 10 coordinates DR and DER requests from ISO 12, transmission company 14, or distribution company 16 by providing key functionality for management and operations of DR/DER both from economical and from reliability perspectives. webDistribute provides the user with the functionality needed to enroll, administer, schedule, dispatch, control, and monitor DR and DER systems, while integrating those with utility distribution and wholesale operations. webDistribute 10 supports various price-based, notification-based and direct control-based retail DR programs while mapping those to wholesale energy, capacity and ancillary services. webDistribute 10 provides an end-to-end solution by tying the wholesale market, e.g., ISOs, to the retail market, e.g., distribution companies, to DR programs that are provided to customers by aggregators.

As seen in FIG. 1, ISO 12, transmission company 14, distribution company 16, aggregator 18, and customer 20 communicate with system 31. System 31 includes server 30, which hosts webdistribute module 10. In particular, server 30 (one or more computers) includes processor 32, database 34, and memory 36. Processor 32 can include any one or more of a controller, a microprocessor, an application specific integrated circuit (ASIC), a digital signal processor (DSP), a field-programmable gate array (FPGA), or equivalent discrete or integrated logic circuitry. The functions attributed to processor 32 in this disclosure may be embodied as hardware, software, firmware, as well as combinations of hardware, software, and firmware.

Memory 36 may include computer-readable instructions that, when executed by a processor, e.g., processor 32, cause the processor to perform various functions ascribed to processor 32 and webDistribute module 10. The computer-readable instructions may be encoded within memory 36. Memory 36 may comprise computer-readable storage media such as a random access memory (RAM), read-only memory (ROM), non-volatile RAM (NVRAM), electrically-erasable programmable ROM (EEPROM), flash memory, or any other volatile, non-volatile, magnetic, optical, or electrical media. In one example, webDistribute module 10 is encoded as instructions in memory 36 that are executed by processor 32.

In FIG. 1, server 30 receives data, e.g., prices, reliability information, from a wholesale market, e.g., ISO 12. Server 30 also receives data from distribution company 16, transmission company 14, aggregators 18, and customers 20. Database 34 of server 30 stores data including, but not limited to, customer data, network topology and operating data, geographic information, metering data, and energy transaction schedules. webDistribute 10, via processor 32, processes the received data using data stored in database 34 using various submodules described below with respect to FIG. 3. webDistribute 10, via processor 32, then generates signals based on the processed data that are appropriate for procurement of energy, e.g., via DER such as turning on generators, or adjustment of load, e.g., via DR such as temporarily turning off air conditioning units, water heaters, and other customer assets 22.

By way of specific example, assume that ISO 12 needs transmission company 14 to reduce its load by a certain amount, e.g., 10 megawatts (MW) over a period of time and at a particular geographic area. ISO 12 sends a DR initiation request to server 30, shown at 40. webDistribute 10, via processor 32, processes the request and distributes the request to any affected transmission company 14 (42), distribution company 16 (44), and aggregator 18 (46). Transmission company 14 receives the request, via webDistribute 10, and looks at its transmission system and assets. As mentioned above, transmission company 14 monitors voltages and loads using EMS equipment and, as such, can target areas for load reduction.

After receiving the DR request distribution from webDistribute 10, aggregator 18 determines which of customers 20 will provide the reduction in energy consumption, and/or which customers 20 will provide energy via DER, e.g., turn on a local diesel generator. Aggregator 18 selects customers 20 and sends the customer DR amounts to webDistribute 10 (48) which then sends the customer DR amounts to distribution company 16 (44). Distribution company 16 needs to know the customers and the amounts that aggregator 18 selected because distribution company 16 is monitoring voltages and loads associated with its substations and feeders.

Upon receiving the customer DR amounts from webDistribute 10, distribution company 16 analyzes the amounts to determine whether those customer DR amounts results in a feasible solution. That is, distribution company 16 analyzes the amounts to determine if those customer DR amounts are all from one phase (A phase, B phase, or C phase) and, as such, would unbalance the feeder(s) involved, or if such load shedding would result in balanced loads. Distribution company 14 transmits an indication to aggregator 18, via webDistribute 10, that either the proposed customer DR amount is acceptable or is not acceptable (49). If not acceptable, aggregator 18 modifies the amounts, transmits the customer DR amounts to distribution company 18 via webDistribute 10 and the process repeats until the customer DR amounts are acceptable.

If acceptable, webDistribute 10 transmits the customer DR amounts to each customer 20 as a requested DR amount (50). The requested DR amount selects one or more customer assets 22 for DR and controls the assets such that the asset, for example, turns off, or adjusts its thermostat thereby reducing its load.

Once a customer's asset 22 is either off or adjusted in some manner, the customer's energy values begin to change. AMI 26 transmits the decreased resource DR amounts, e.g., energy usage in watts, to webDistribute 10 (52). In turn, webDistribute 10 transmits the resource DR amounts received from customer 20 to distribution company 16 (44). Distribution company 16 aggregates the amount of DR that each selected customer is providing and transmits a notification to webDistribute 10 of how much DR each substation will provide (49). webDistribute 10 transmits the substation DR information received from distribution company 16 to transmission company 14 (42). Transmission company 14 aggregates this information and transmits a notification to webDistribute 10 of how much DR each transmission line will provide (54). webDistribute 10 transmits the transmission line DR information received from transmission company 14 to ISO 12 (56), thereby completing the original request received from ISO 12 to reduce loads.

Using the techniques described in this disclosure, webDistribute 10 ties the wholesale market, e.g., ISOs, to the retail market, e.g., distribution companies, to DR programs that are provided to customers by aggregators. It should be noted that although the specific example described above was directed to DR, other examples include DER. For example, aggregator may determine that certain customers 20 with generation capabilities, e.g., diesel generators, should be brought on line to increase capacity. Steps similar to those described above are followed in order for aggregator 18 to coordinate with distribution company 16 the specific customers, assets, and the like to keep loads balanced. webDistribute 10 then communicates with the particular customer asset 20, e.g., a generator, in order to bring that asset on line. AMI 26 reports to webDistribute 10, which in turn distributes the information to distribution company 16, as described above.

It should be noted that in other examples, transmission company 14 or distribution company 16 can initiate the DR request rather than ISO 12. For example, distribution company 12 may see a spike in energy prices at a particular time of day due to the loss of a transmission line on the grid of transmission company 14. As such, distribution company 12 may then initiate a DR request to shed load in order to bring down prices. In another example, distribution company 12 can initiate a DR request per feeder in order to eliminate a loading violation.

Figure 2:
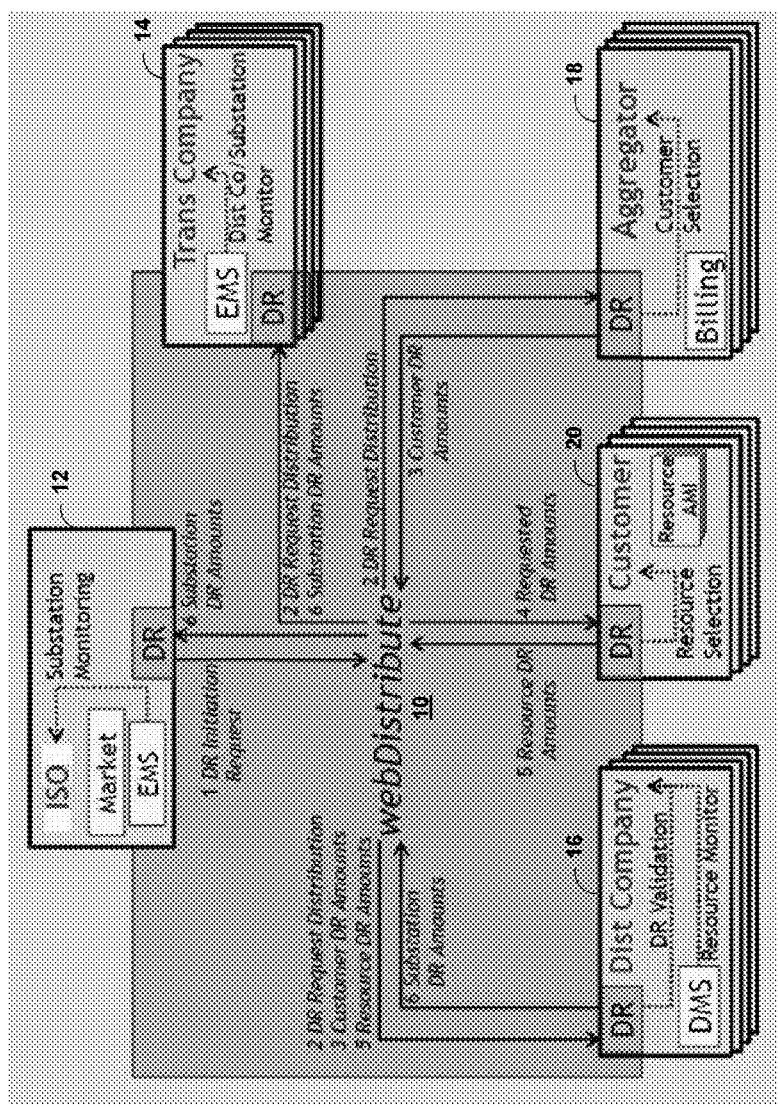
FIG. 2 is a diagram illustrating another example of management information flow, in accordance with this disclosure.

FIG. 2 is a diagram illustrating another example of management information flow, in accordance with this disclosure. As seen in FIG. 2, a balancing authority, e.g., ISO 12, sends a DR initiation, or response, request to webDistribute module 10 (flow line "1"). webDistribute module 10 transmits, or distributes, the DR response request to transmission company 14, aggregator 18, and distribution company 16 (flow lines "2"). Aggregator 18 transmits customer DR amounts to webDistribute module 10 (flow line "3"). In other words, for each customer, webDistribute module 10 receives customer location information and customer DR values from aggregator 18. webDistribute module 10 transmits a requested DR amount to each customer 20 (flow line "4"). webDistribute module 10 then receives a resource DR amount from each customer 20 (flow line "5") and transmits the resource DR amount to distribution company 16 (flow line "5"). webDistribute module 10 then receives substation DR amounts from distribution company 16 (flow line "6"), and webDistribute module 10 transmits the substation DR amounts to transmission company 14 (flow line "6") and ISO 12 (flow line "6"). To summarize, webDistribute module 10 and, in particular, distribution grid management module 76 (FIG. 6) determines aggregated DR flows per substation and any grid violations, e.g., cold load pickup and/or load imbalance issues, at flow lines "1"-"5". Then, webDistribute module 10 and, in particular, distribution grid management module 76 transmits the aggregated DR flow to ISO 12 at flow line "6".

Figure 3:
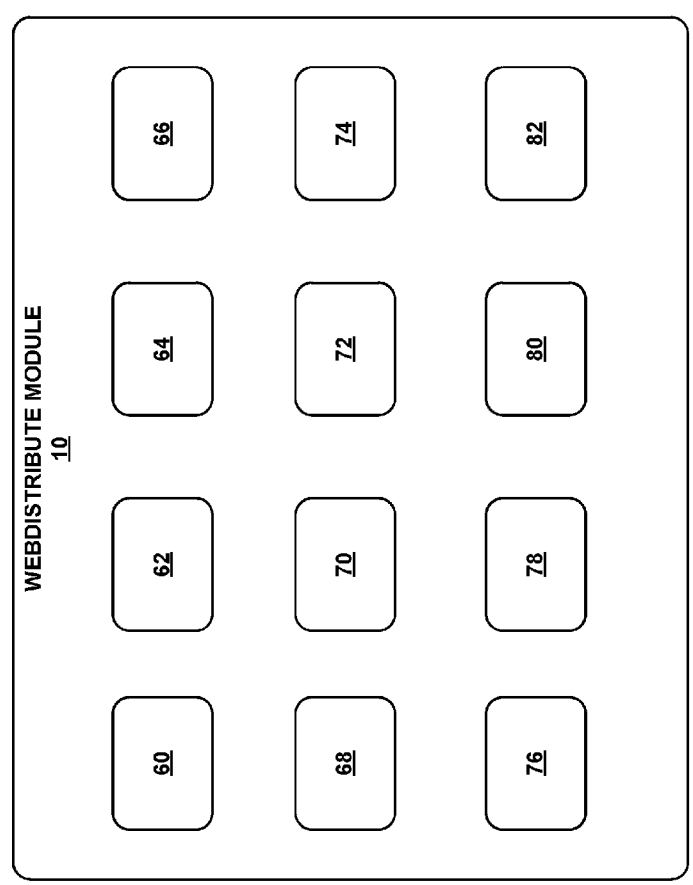
FIG. 3 is a block diagram illustrating various example submodules of webDistribute, in accordance with this disclosure.
Figure 4:
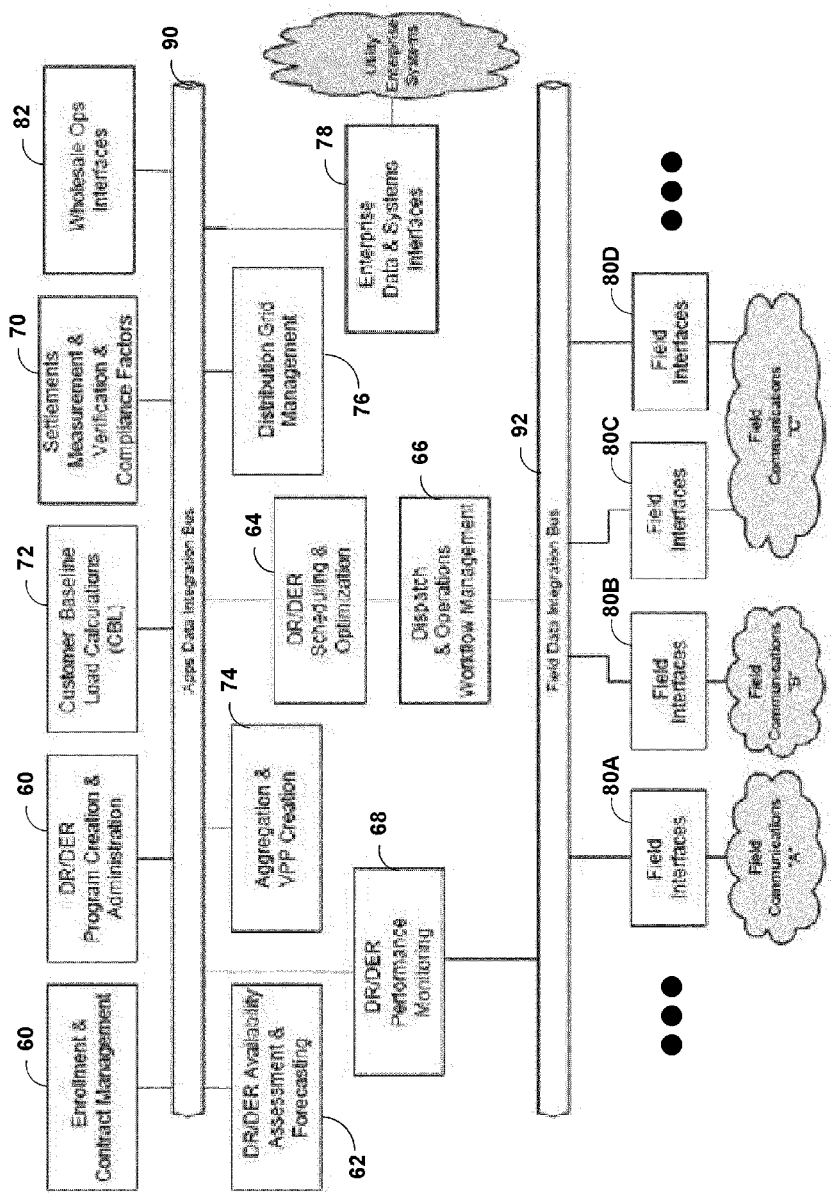
FIG. 4 is a schematic illustrating one example of communication between various submodules of webDistribute through databases and internal data/message integration buses.

FIG. 3 is a block diagram illustrating various example submodules of webDistribute 10, in accordance with this disclosure. Although these submodules are referred to below as modules, it should be understood that each of these modules form a part of webdistribute module 10. webDistribute module 10 includes the following submodules: DR/DER Programs Creation and Administration—Customer Enrollment and Contract Management module 60, DR/DER Availability Assessment & Forecasting module 62, DR/DER Scheduling & Optimization module 64, DR Dispatch & Operations Workflow Management module 66, DR/DER Performance Monitoring module 68, DR/DER Settlement Measurement, Verification and Compliance Calculation module 70, Customer Baseline (CBL) load profile Calculation, Update, and Adjustment module 72, DR Aggregation & Virtual Power Plant (VPP) Creation module 74, Distribution Grid Management module 76, Enterprise Data and Systems Interface module 78, Field Interface module 80, and Wholesale Operations Interface module 82. Each of these modules is described below and FIG. 4 illustrates how these modules communicate with one-another through webDistribute databases and webDistribute internal data/message integration buses.

DR/DER Programs Creation & Administration—Customers Enrollment & Contract Management module 60 enrolls customers in DR programs, manages the programs and customers, and provides information on customer participation in DR for the whole DR Management System. Certain data elements of module 60 can be synchronized with the information maintained in the host utility's Customer Information System (CIS).

DR/DER Availability Assessment & Forecasting module 62 is responsible for determining the current DR/DER availability by location, program, product and time, as well as forecasting the same for a future time. Module 62 determines the maximum possible DR value for any required date and time interval in the future, based on the DR program and past performance. Calculated DR Availability is used by a Balancing Authority (who determines required/proposed DR value for desired date/time interval), and DR Providers (estimates maximum DR capacity). Inputs to module 62 include CIS data on the customers enrolled in each of the existing DR programs and DR customer statistical performance (compliance factor). Outputs from module 62 include the maximum possible DR value per program and area (zone), including the list of the participating customers. The calculation is done for a required date/time interval.

DR/DER Scheduling & Optimization module 64 is responsible for scheduling DR/DER operation, while considering availability, program parameters and constraints as well as distribution grid constraints. In some example implementations, this module includes capabilities for schedule optimization, based on economics and/or capability requirements. Module 64 creates a "DR Event" by defining the list of participating customers per program, their expected kilowatt-hours (kWh), activation, and release time. The DR event is built for date, time interval, and the required/proposed value defined by the Balancing Authority. The DR Scheduling function has multiple users and different DR Providers. The DR Provider is satisfying the DR scheduling requirements, and has the opportunity to maximize profits. Inputs to module 64 include event date/time, DR availability, DR programs rules and individual customer constraints related to the event date/time, and individual DR Provider objectives. Outputs from module 64 include a list of the participating customers per program, area, zone, expected kWh reduction, activation, and release times.

DR Dispatch & Operations Workflow Management module 66 is responsible for converting DR/DER schedules into activation and release commands for individual, or individual classes of DR/DER resources (sending messages/signals). Module 66 provides DR event implementation according to the scheduled list of participating customers, their programs, and their past individual activation and release times. Module 66 interacts through the Field Data Integration Bus with customer field interfaces and through them with individual customers or customer groups. For "Callable DR" participants, module 66 sends event notifications (email, telephone calls, etc.) before an event. For "Direct Load Control" customers, module 66 sends signals on DR activation and release. For Critical Peak Pricing, module 66 sends price information for scheduled date/time interval. An input for module 66 includes a list of the event participating customers per DR Program with identification of the activation/release time (the DR Program defines how the participants are activated and released). An output from module 66 includes a list of messages (callable DR) or signals (direct load control) with a corresponding time schedule.

DR/DER Performance Monitoring module 68 is responsible for monitoring DR/DER operation and comparing performance against schedules (by location, program, product, and time). The assessment may be performed for the current operation using available meter/HAN-gateway data, SCADA data, bellweather meter, or other sources of data. Module 68 may receive performance monitoring from one or both of AMI and SCADA. AMI type implementations receive the DR customer's meter readings in close to real-time mode (ping point mode), and compares the readings with a baseline and calculates the difference, which is the DR value. SCADA type implementations monitor remote terminal unit (RTU) measurements at the supply substations and feeder heads where DR participants are connected. Inputs to module 68 include a list of the customers to be monitored in ping point mode, access to the latest MDM/AMI measurements for these customers, expected consumption (adjusted CBL, described in more detail below), and a list of substations and feeders monitored through SCADA. Outputs from module 68 include expected and real energy consumption per measured time intervals for each monitored customer and totals, and expected and real energy consumption per measured time intervals for each substation and feeder.

DR/DER Settlement Measurement, Verification and Compliance Calculation module 70 performs a post operation analysis to generate required billing determinates for billing and settlements use. Such an analysis generally involves comparing event MDM/AMI measurements against adjusted customer baseline profiles. Module 70 compares DR customer measured values with adjusted CBL values, and consumption decrease is calculated. These values are stored and used for DR customer payments (goes into CIS, for example), and DR Statistical Performance and Compliance Factors Calculation. Measurement and verification functionality may be much more comprehensive if Grid Management functionality is used to determine aggregated DR values at the delivery points (substations and feeders). Inputs to module 70 include a list of the event participating customers together with their date/time of activation and release, their MDM/AMI measurements for DR event date, including event time interval and period before DR, and CBL load profiles. Each DR customer measured and expected without curtailment (adjusted CBL) energy consumption for each time period when the customer participated in a DR event. The difference of these two values is the customer DR value. Outputs from module 70 include the total DR values per area, zone, and program.

Customer Baseline (CBL) load profile Calculation, Update, and Adjustment module 72 computes CBL per customer type and creates and supports CBL for all DR customers. CBL is the expected energy consumption profile for a given customer or customer class, absent a signal to reduce consumption (no DR event). Customer DR performance is calculated as a difference between the customer's expected energy consumption (CBL) and the customer's actual measured consumption amount. Module 72 also provides DR "morning" adjustment for each event participating customer. Inputs to module 72 include a list of the customers participating in CBL load profile calculation, MDM/AMI data for each of these customers, DR event date/time, and a list of participants. Outputs from module 72 includes updated CBL for each measured time interval based on the latest available MDM/AMI measurements, as well as adjusted CBL values for each DR participating customer.

DR Aggregation & VPP Creation module 74 is responsible for DR and DER capability aggregation by area, geographical zone, network location (e.g., transformer, lateral, feeder, substation), DR programs, Product capability (spin, non-spin, etc.) and time intervals. Module 74 calculates DR totals (sums) from all DR schedules, coming from the different DR Providers and different DR programs. These sums are calculated per area, zone, and program, taking into account statistical performance (compliance) of the selected customers. This data is sent back to the authority that required this DR Event to be scheduled. Inputs to module 74 include DR Event individual schedules coming from DR Providers. Outputs from module 74 include the expected decrease in consumption for each time interval of the scheduled DR Event calculated per area, zone, and DR program.

Distribution Grid Management module 76 is responsible for network topology management, and assessment of DR/DER operations/schedules against network constraints and capabilities. Module 76 determines DR Aggregation per substation/feeder, calculated by taking into account power losses and voltage dependence. In addition, module 76 determines whether any DR related violations exist, e.g., load pick up in DR release (or before activation) and DR unbalanced distribution between phases (increase in neutral wire current). Module 76 also determines the Volt/VAR (volt-amperes reactive) impact on DR. Inputs to module 76 include the source of the distribution grid topology (including DR event data/time statuses of the normally opened switches), MDM/AMI and CBL data for desired date/time (scheduled or implemented DR event), and meter ID mapped through the service points to the grid topology. A service point is the logical node linking demand-side resources (DR and DER) to the customer and to the electrical grid. A service point attributes may include a service point ID, a node ID, connection type (single phase or three phase), phase designation, maximum kW demand, and maximum kVAR demand. An output from module 76 includes DR values aggregated per electric node, e.g., substation and feeder, for activation and release times. The output includes the effect of load pick up before and after DR, and the effect of power losses and voltage dependence. Feeder aggregation is done per phase and includes determining possible violations from load pick up and uneven phase distribution.

Enterprise Data and Systems Interface module 78 is responsible for data exchange, and data synchronization, with external and enterprise databases and systems, including MDM, DMS, GIS, CIS, asset management, billing system, etc. Each field interface module 80 is responsible for data communications with field devices. The modular nature of these interfaces allows use of different modules to support different protocols, device classes and control operations. Wholesale Operations Interface module 82 is responsible for interfaces with wholesale scheduling and trading systems.

FIG. 4 is a schematic illustrating communication between the various submodules of webDistribute described above with respect to FIG. 3, through webDistribute internal data/message integration buses. In FIG. 4, the Apps Data Integration Bus 90 is an interface that provides communication between modules internal to the utility, e.g., modules 60, 62, 70, 72, 74, 76, 78, and 82. Field Data Integration Bus 92 is an interface that provides communication between field interfaces at the customer site. Each field interface module, e.g., modules 80A-80D, communicates with hardware, e.g., field communications "A", at the customer site. Various modules, e.g., modules 64, 66, and 68, are in communication with both the Apps Data Integration Bus 90 and Field Data Integration Bus 92. As seen in FIG. 4, field interface modules 80A-80D communicate with various devices, or "field communications".

Figure 5:
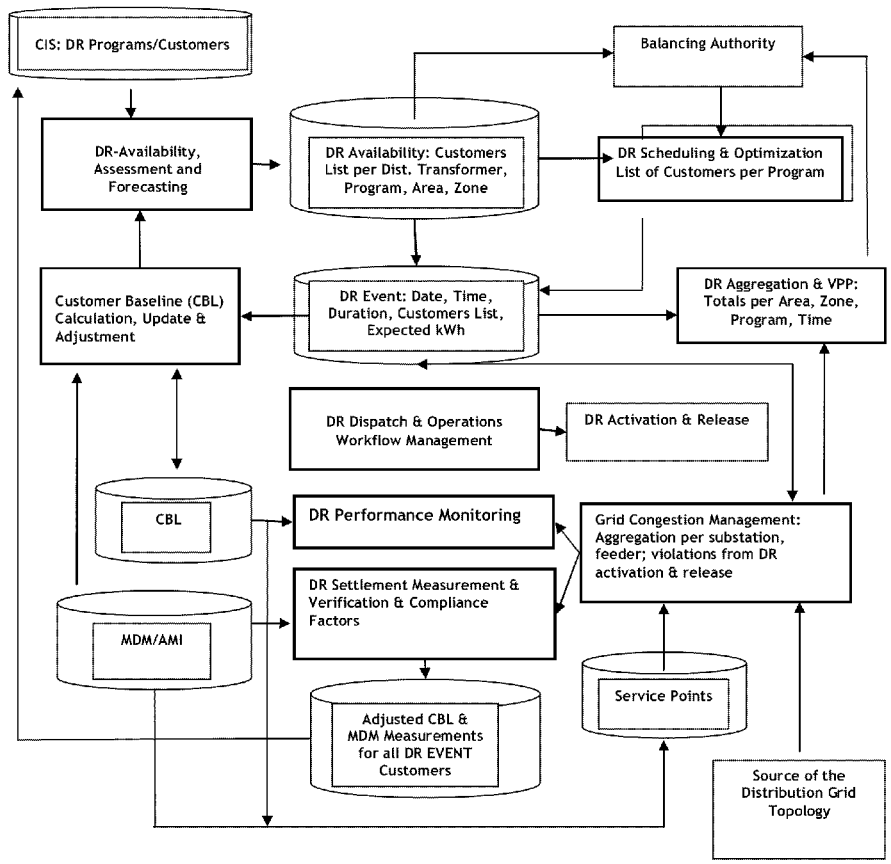
FIG. 5 is a flow diagram illustrating one example of a dispatchable DR management system, in accordance with this disclosure.

FIG. 5 is a flow diagram illustrating one example of a dispatchable DR management system, in accordance with this disclosure. In particular, FIG. 5 illustrates data flow between various submodules of webDistribute module 10 and databases, e.g., CIS, CBL, MDM/AMI, DR Availability, DR Event, Adjusted CBL & MDM measurements, and Service Points. It should be noted that, in some example implementations, not all elements shown in FIG. 5 are required for system operations. Rather, FIG. 5 illustrates one example of data flow. Further, it should be noted that the databases shown in FIG. 5 may reside within server 30 (FIG. 1) or stored on one or more computer-readable storage media in communication with server 30 (FIG. 1).

As indicated above, this disclosure is directed to dispatchable DR management systems and methods that integrate DR with distribution grid topology. Again, dispatchable DR management is the process of controlling end-use customers (load) from their normal consumption pattern with the objective of decreasing power (energy) demand during peak hours when energy generation is expensive, shifting demand to off-peak times, or balancing demand through load shedding at times of generation deficit. Using the dispatchable DR management systems and methods described in this disclosure, DR is integrated with distribution grid topology, which allows transmission and distribution operators to consider the impact of DR in the distribution grid and to determine DR availability at the transmission nodes. The result of the proposed DR topological aggregation is the true value of the demand decrease calculated per substation and feeder. The DR values per substation are reported back to ISO/RTO, used for scheduling, and serve as targets for DR real-time monitoring. DR values aggregated per feeder/phase or any other grid element are available to the distribution system operators and are used to prevent possible violations such as load pickup before and after a DR event, lack of coordination between DR and distribution grid Volt/VAR control, and asymmetric DR balancing between phases.

Presently, DR aggregators have no concept of the network model and completely disregard how DR is distributed across the distribution network and its consequences. Moreover, the transmission system operator needs to know how much DR is available at the transmission substation level. Using current systems and methods, aggregators are providing DR estimates at the geographic zone level rather than on a substation or feeder level, for example.

In accordance with various techniques described in this disclosure, the distribution system topology is modeled in the DR scheduling process. Modeling the distribution system topology in the DR scheduling process brings the distribution network analysis to the DR scheduling process. Moreover, the DR aggregation through the distribution grid calculates the DR values at the nodes of the transmission system, which serves as an opportunity for better monitoring and verification of requested DR. It also creates opportunities of including DR effect in the transmission system scheduling, optimization, and network applications. This step brings the distribution network analysis to the DR scheduling process. Moreover, the DR aggregation through the distribution grid calculates the DR values at the nodes of the transmission system, which serves as an opportunity for better monitoring and verification of requested DR. It also creates opportunities of including DR effect in the transmission system scheduling, optimization, and network applications.

Current DR management involves four main participants: (1) Energy balancing authority/transmission system operator (ISO/RTO), generally the DR initiator and consumer; (2) DR aggregator (provider) integrator of individual DR resources (customers willing to decrease consumption) into DR product (energy, reserve), generally the DR seller and manager; (3) Distribution utility company/distribution system operator (DSO), which operates the distribution grid where DR events are happening. A DR event affects the grid's operating conditions (voltages and currents), and therefore is monitored by DSO; (4) Customer—energy consumer, willingly subscribed to the DR programs, created and controlled by the aggregator.

As described above with respect to FIG. 1, the DR scheduling process often starts from the balancing authority who orders (requests or offers) DR by determining its desired volume, date/time, and duration. The order covers the whole ISO/RTO territory, or some parts of it (zones). This DR order is submitted to aggregators, who compare it with their DR availability and select the DR participating customers. Taking into account each customer's distinct compliance factor (statistically calculated), the aggregator determines expected DR total, which is reported to the balancing authority. Using current techniques, however, the DR value, calculated as described above, is not directly mapped to the electrical grid. No information is provided as to the circuits in the distribution or transmission system in which the load reduction is taking place. The absence of the information on which supply substation is involved in the DR event and what DR value is scheduled for each substation creates uncertainty to the transmission system operator, who needs this data for scheduling and real-time monitoring.

Figure 6:
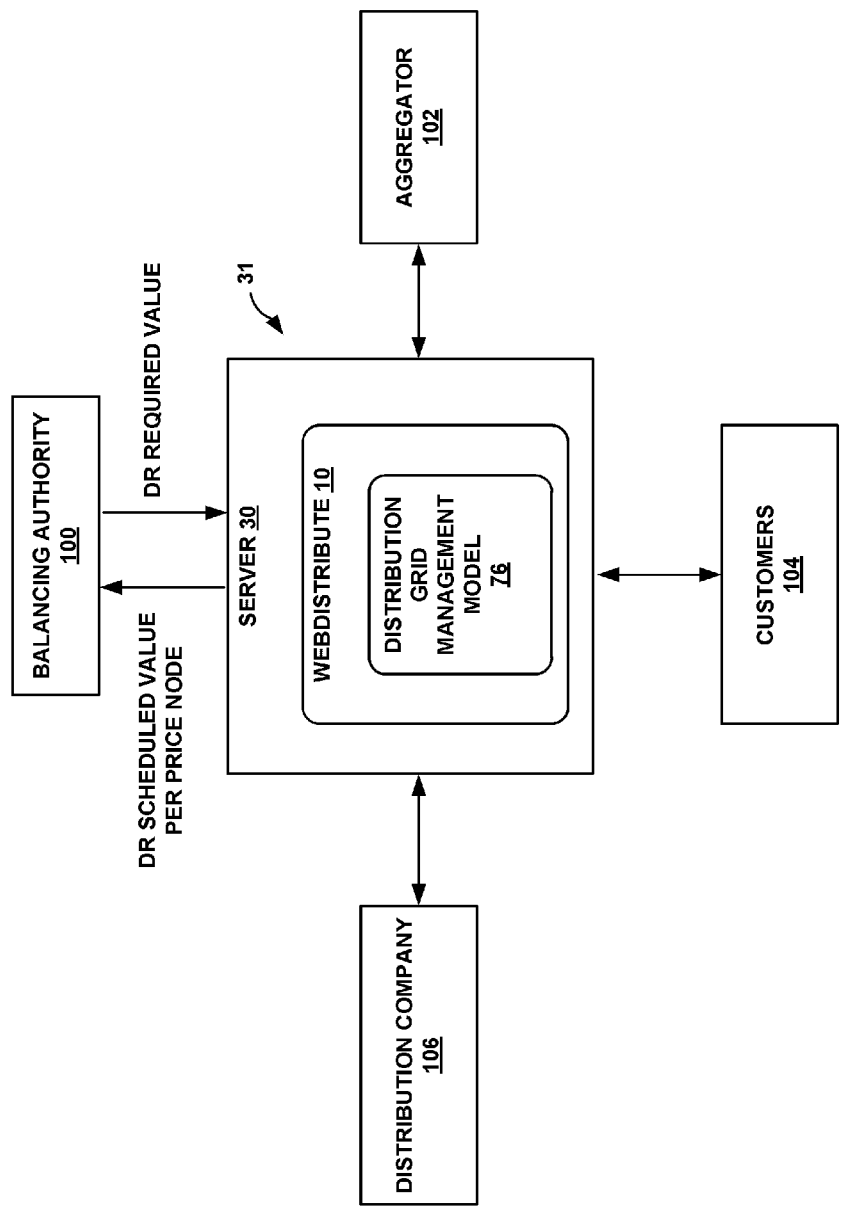
FIG. 6 is a block diagram illustrating one example system that incorporates distribution network analysis in the DR scheduling process, in accordance with this disclosure.

FIG. 6 is a block diagram illustrating one example system that incorporates distribution network analysis in the DR scheduling process, in accordance with this disclosure. In FIG. 6, balancing authority 100, e.g., an ISO or RTO, initiates a DR request and transmits a required DR value to system 31 and, in particular, server 30. webDistribute module 10 of server 30 processes the received DR value and transmits the request to aggregator 102. Aggregator 102 receives the DR value requested by balancing authority 100 and, in response, transmits a list of customers 104 that are participating in DR programs and their DR amounts to webDistribute module 10 and, in particular, distribution grid management module 76. In particular, distribution grid management module 76 receives, for each customer 104, customer location information and a customer DR value, from aggregator 102. Using various techniques of this disclosure, distribution grid management module 76 aggregates these customer DR values through a distribution grid topological model and determines, based on the received customer location information and DR values, a DR value for each electric node, e.g., substation, substation busbar, feeder, lateral (radial off of the feeder), and the like. This is in contrast to other known systems that simply report back to the ISO/RTO the DR scheduled value per zone, e.g., an entire city, rather than at a level such as a substation or feeder for example. It may be important that balancing authority 100 know the DR values at each affected electric node, e.g., substation or feeder, because the price of delivering energy may be determined per electric node.

As a result of the topology model provided by distribution grid management module 76, the DR is aggregated (summed up) through the distribution network to the supply (transmission/distribution) substations. This aggregation may take into account the effect of power losses (leads to DR increase), and the power to voltage dependence (typically DR decrease). The DR values per electric node are calculated and reported back to balancing authority 100, e.g., the ISO/RTO, to be used for operations planning, and serve as targets for ISO/RTO DR real-time monitoring. DR values aggregated per feeder/phase or any other grid element are available to distribution company 106 and can be used at its discretion. The DR connection to the distribution network topology creates valuable opportunities both for transmission and distribution system operators. The DR values are calculated at the points of delivery, e.g., transmission grid nodes, taking into account distribution grid losses and the effect of voltages. The nodal-based DR values may be used for transmission system scheduling, optimization, and any network related calculations.

The aggregation performed by distribution grid management module 76 may be implemented through a customer meters/service point mapping to the distribution transformers with a model of the grid topology (real-time or "look ahead" statuses of the normally opened switches). The model starts from the distribution transformers and moves upstream to the supply substations. Distribution grid management module 76 transmits, via server 30, the DR information to distribution company 106, which verifies the DR information determined by distribution grid management module 76. Once verified, distribution grid management module 76 transmits, via server 30, the DR schedule value per electric node to balancing authority 100.

The DR values aggregated to the distribution transformers may be used in the distribution power flow and optimization (both Volt/VAR control and feeder reconfiguration). It is also feasible to use these aggregated DR values during a large area service restoration to relieve overloaded or unbalanced conditions.

Figure 7:
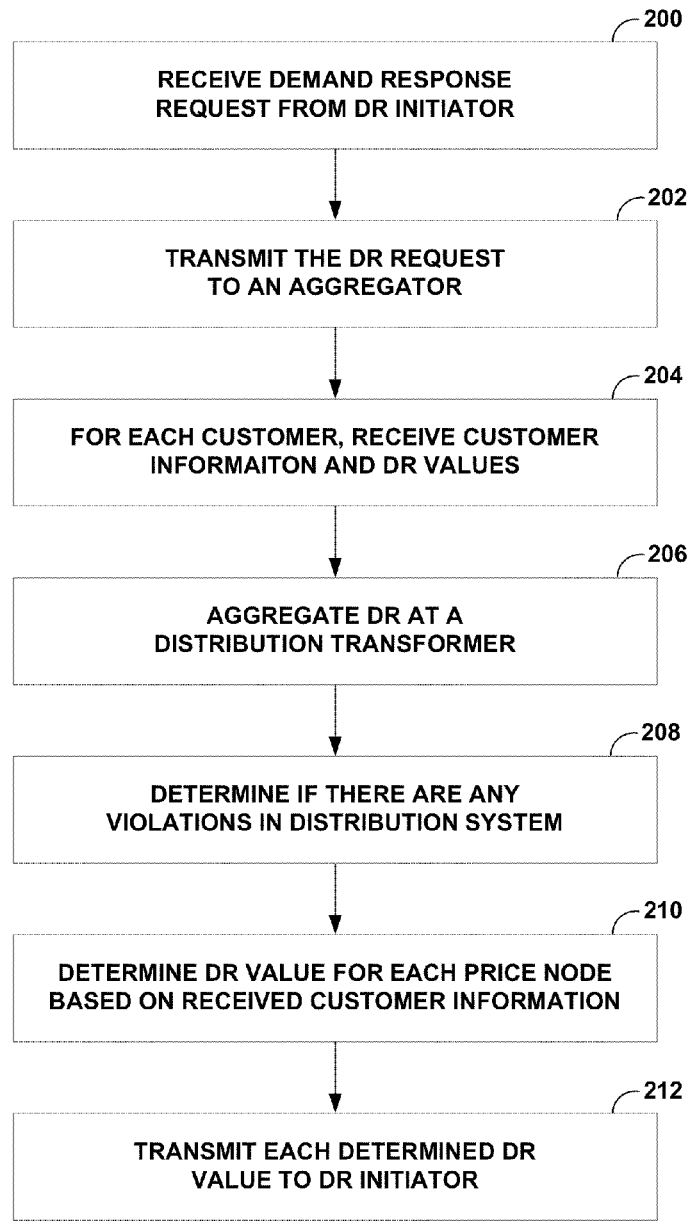
FIG. 7 is a flow diagram illustrating one example implementation of distribution network analysis in the DR scheduling process, in accordance with this disclosure.

FIG. 7 is a flow diagram depicting one example method implementing various techniques of this disclosure. In particular, FIG. 7 depicts an example method for incorporating distribution network analysis in the DR scheduling process. In FIG. 7, webDistribute module 10, via server 30, receives a DR request from a DR initiator, e.g., balancing authority 100 of FIG. 6 (200). webDistribute module 10, via server 30, transmits the DR request to an aggregator, e.g., aggregator 102 of FIG. 6 (202). webDistribute module 10, via server 30, receives customer location information and a customer DR value for each customer from the aggregator, e.g., aggregator 102 of FIG. 6 (204). Customer location information includes nodal information that will allow distribution grid management module 76 to determine topologically where each customer is located in the electrical grid, e.g., served by a particular transformer on a particular feeder by a particular phase. Distribution grid management module 76 aggregates DR at one or more distribution transformers on a distribution system (206). A power flow is then executed in the distribution system. In some examples, distribution grid management module 76 determines if there are any violations in the distribution system, e.g., cold load pickup, imbalances (208). Distribution grid management module 76 determines, based on the received customer location information and DR values, an aggregate DR value of each electric node affected by the DR request (210). Distribution grid management module 76 then transmits, via server 30, each determined aggregated DR value to the DR initiator, e.g., balancing authority 100, (212). It should be understood that the method shown and described above may be implemented, at least in part, by server 30 and in particular by processor 32.

Integrating DR with distribution grid topology using the techniques of this disclosure provides further benefits. The integration allows distribution company 106 to verify whether DR activation or release produces violations or any other problems in the distribution grid. DR release violations are related to the fact that switched back DR loads often do not return to their original level of energy consumption, but will consume more than before. The increase in consumption is called cold load pickup (CLPU), and its effect can be felt from minutes to hours. One cause for CLPU is in the physical properties of DR loads. The usual types of DR loads are thermostatically driven loads such as air-conditioning, spaceheating, water heating, etc.

These loads generally include electrical motors and their power consumption after some time off is higher than their steady state (stable) consumption (motor starting currents, and enduring demand due to loss of momentum). Another cause of CLPU is the loss of diversity (all loads start consuming at the same time when DR is released). If a high number of DR-affected devices are switched back when the general level of consumption is still high enough, or if the DR-affected devices are connected to the same feeder, it may create overload triggering or low-voltage violations.

Another form of load pickup can sometimes take place before a DR event involving "callable DR" participants. This increase in energy consumption is typically smaller than CLPU after the DR event, and may be considered a special case.

A different source of possible problems is a lack of coordination with switchable shunt capacitor and load tap changer (LTC) voltage regulator controllers. Distribution system Volt/VAR control may significantly decrease the effectiveness of DR, and lead to voltage violations. Violations related to the DR activation may be the result of asymmetric DR balancing between phases (DR involvement of the single phase consumers or open wye/open delta transformer connections used for three-phase consumers), which lead to the increase of neutral wire current and three-phase bus voltage imbalance.

As indicated above, there are three main areas of DR and distribution grid mutual influence that may lead to grid violations and DR loss of effectiveness: load pickup after and before DR event, lack of coordination between DR and distribution grid Volt/VAR control, and asymmetric DR balancing between phases. Examples of DR and distribution grid mutual influence are provided in "Demand Response and Distribution Grid Operations: Opportunities and Challenges," IEEE Transactions on Smart Grid, Vol. 1, No. 2, September 2010, pages 193-198, the entire content of which is incorporated herein by reference.

The foundation of Distribution Grid Congestion Management (DCM), which is provided by distribution grid management module 76 of webDistribute 10, is the Distribution System Topological Model (DSTM). Using the techniques of this disclosure, distribution grid management module 76 models distribution grid topology starting from the customer service points and ending at the supply substations connecting the distribution grid to the transmission system using functionality described below with respect to DSTM.

DSTM identifies the electrical location of the Demand Response (DR) participating customers and Distributed Energy Resources (DER). DSTM provides DR/DER aggregation via supply substations, feeders, or any other grid elements according to the actual or planned distribution network topology. The goals of this aggregation are to obtain DR/DER values for each Node of the transmission system to be used in transmission operation planning, model DR/DER impact on the distribution grid, check grid constraints, and manage possible congestions. Distribution Grid Management module 76 utilizes the Distribution System Topological Model in order to provide Distribution Grid Congestion Management. In one example, DSTM data is stored in database 34 of server 30 (FIG. 1).

DCM is closely integrated with the DR scheduling process, Customer Baseline (CBL) and Load Schedule. DR activation, release time, and the list of participants in DR are available from the DR Schedule. DSTM updates the topology of the distribution network (primary distribution/medium voltage network) based on the information about real or planned statuses of the topologically significant switches—circuit breakers, sectionalizers, and tie switches. The updates are done for the date and time of the corresponding DR event. The DCM Load Flow calculation function uses customer loads and DR values coming from the CBL Load Schedule and DR Schedule.

DSTM input data are lines, transformers, and switches—actual elements of the distribution network. Topologically these elements represent Branches of the grid and are described by two Nodes defining their connections to the grid. Additional topological attributes are phases and ratings for checking loading constraints.

Transformers are described by their connection type (e.g., a combination of wye and delta, including open wye), which may create an additional phase at the secondary voltage side. Switches are modeled by their statuses—open or closed, with two modes defined per switch—normal and actual. Actual switch statuses are gathered through the external interface as dynamically updated information.

DSTM includes distribution grid topology in terms of lines, transformers, and switches. For each line, information may include a unique segment ID, beginning and ending nodes that define the line, phase information, and short and long term maximum current information. For each transformer, information may include a unique transformer ID, a high-side node name and a low-side node name that define the topological connections of the transformer, phase information, connection type, transformer core information, and rating information (e.g., total kilovolt-amperes (kVA) or kVA per phase). For each switch, information may include a unique switch ID, beginning and ending nodes that define the topological connections, switch type (e.g., circuit breaker, recloser, load switch, etc.), phase information, status (normally open or normally closed), rating information (e.g., kVA or Amps), and whether the switch is gang operated.

Feeder Head Busbar (FdHdBb) and Feeder Head define the feeder connections to the supply substations (sources) and feeder beginnings. They also have associated input data, such as (predefined) voltages, power factors, and protection thresholds.

Energy consumers (customers) and energy generators/storage devices (DERs) are included in DCM through injections, with nodes as one topological attribute. Injections represent load, generation, or a combination of both load and generation. Positive injection values indicate loads, while negative injection amounts represent generations. An injection may represent a single consumer (e.g. a large industrial or commercial customer connected directly to the primary distribution) or a set of consumers (e.g., residential or small commercial customers supplied through the same distribution transformers). In the latter case, the injection value may be calculated as the sum of all customers' loads and generation for the same time interval. It is also possible to integrate customer load and generation (for example, solar) if they are served by the same energy meter.

Each individual customer is represented by energy (revenue) meters linked to service points (topological connection). Service points are mapped to the Node names or to the distribution transformers, for example.

The injection and DR values stored, e.g., in a table in database 34 (FIG. 1) are implicitly defined in input data, and are calculated for a given date and time from the customers' data on already consumed energy (past), load scheduling (future), or near real-time (DR event monitoring based on the latest Advanced Metering Infrastructure (AMI) data).

It is assumed that most energy meters are AMI type. In this case, meter measurements (kWh for a given date, time, and duration) reflect customer consumption in a relatively short time interval (from five-fifteen minutes up to one hour). These measurements are the main source of injection value information. Injections for a given time may be calculated by summing up the measured consumption at that time for all customers connected to the same Injection.

It should be noted that, in some example implementations, utilization of the AMI measurements directly from a Meter Data Management (MDM) database can be done if the desired time is in the past and the measurements are already available. The DR Scheduling process can utilize Injection values in the future look-ahead mode.

In some examples, DR values are calculated separately from the total Injection. The DR values may be used for calculation of DR flow—imaginary flow that defines the decrease in energy consumption during a DR event.

For any desired date and time in the near future, the forecasted load values may be calculated for each customer by the Customer Baseline (CBL) Scheduling function of a Customer Baseline Load Profile Calculator. The results of these calculations are stored as Load Schedule Results in a table. The date and time for when the injections are needed are defined explicitly in the Load Schedule time interval Start DT-End DT.

Data is available for any desired date and time in the past that customer consumptions (load) have been measured. These data are available from energy (revenue) meters (AMI), typically through a Meter Data Management (MDM) System. They are used by the Customer Baseline Load Profile Calculator (CBLC) and other webDistribute applications. Each meter may contain multiple records with the timestamp of the reading, the energy value (kWh), the time between this reading and the previous one, as well as the meter energization status (fault indicator).

DR event actual values for customers that participated in DR are calculated using the CBL Adjustment function of CBLC. A table in a database, e.g., database 34 (FIG. 1), contains estimated DR values (calculated from actual measurements and adjusted CBL) for all DR event participated customers. These values are used to calculate the DR component of Injections.

The goal of real-time DR monitoring is to estimate DR values using the latest meter readings or available telemetry receiving through SCADA. It is feasible to assume that for important DR participants the energy measurements during a DR event are coming every five minutes. These measurements serve as input for the CBL Adjustment function mentioned above. This function verifies measured kWh and expected DR kWh. The simplest implementation of DR monitoring calculates the DR components of the Injection in close to real-time mode as soon as the measurements are available. Based on this data, the Load Flow calculates the DR values at the Feeder Heads and Feeder Head Busbars, which can be used by Transmission and Distribution System Operators for DR monitoring.

A more sophisticated implementation of DR monitoring is based on RTU measurements received from SCADA. Load Schedule values are calculated by CBL Schedule function for all customers, and are used by the Load Flow to determine the Feeder Head and Feeder Head Busbar expected flows (without DR). The DR values calculated at the same Feeder Head and Feeder Head Busbars are subtracted from the flows previously calculated for the DR event. The results are compared with measurements (powers or currents) available from SCADA at the same topological locations.

Actual (real-time or desired for study) topology of the distribution network is defined by the actual statuses of the switches and energization of the Supply Sources—Feeder Head Busbars. This information may come from external interfaces. In addition, injection Load (Generation) and DR values are calculated as described above, and come from external interfaces.

DSTM main internal components are the Nodes and Branches. They are initially built from the input data (lines, transformers, and switches) by the Model Builder function of Distribution Grid Management module 76. In some examples, the Model Builder function does not consider the statuses of the switches (open/close and energization of the Feeder Head Busbars (Supply Sources), but instead builds a unique table of Nodes, a table's Branches, and established connections between Nodes and Branches. Nodes and Branches are assigned different types based on their topological meaning: 1) Source (Feeder Head Busbar); 2) Feeder Head, 3) Injection, 4) Others. Possible Branch types include the following: 1) Line, 2) Transformer, and 3) Switch.

The Trace function of Distribution Grid Management module 76 considers actual and desired statuses of the switches and Feeder Head Busbar energization (external interfaces, Section 5). Based on this information, the Trace function establishes Nodes/Branches/Injections connection to the Supply Sources (substations). For grid elements connected to the supply sources, the Trace function sets the Node energization status and defines the Branch orientation relative to the source. The Trace function also sets references from the receiving Branches and Nodes to the supplying Branches (oriented graph).

The Model Builder function of Distribution Grid Management module 76 creates two main DSTM table classes: Node and Branch. Node table contains the ID, Name, Phase, Type, and Number of Connected Branches. Each Node also has access to the list of connected Branches. In some examples, tables mentioned in this disclosure may be implemented in a database, e.g., database 34 of server 30.

The Branch table contains the identifiers for the Branch, the connectivity nodes A and B identifiers, phase, type (line/transformer/switch) and Equipment ID. Additional topological information for Branches is stored in the separate Transformer Model and Switch Model tables. Access to this data is provided through identifiers Type and Equipment ID. The Model Builder function input data comes from tables: Lines, Transformers, and Switches.

The Data Checker function of Distribution Grid Management module 76 may be used as a pre-processor for the Model Builder function. The goal of the Data Checker is to determine gross errors in the input data. For example, the same Node name cannot be used for both the beginning and ending of the line.

In one example algorithmic solution, each line, transformer, and switch creates an element of the Branch class. The function reads the Node A and Node B of the lines, transformers and switches and checks them against names already included in the Nodes class. If the Nodes do not exist in the Node class, they are added and an internal Node ID is created. The Branch is defined as connecting these two nodes. The Branch table uses the internal Node IDs. If either Node or both Nodes already exist in the Node class, they are not added again. In all cases, the number of Branches connected to the Branch Nodes is increased by one. As a result of the above procedure, all nodes are included in the Node class only once, and node names are unique. Each node phase is calculated as a sum of all branch phases connected to this Node.

Branch class describes the lines, transformers and switches as references to node A and B in the Node class. Branch class also contains phase, type, and Equipment ID. Each Service Point, Injection, Feeder Head Busbar, and Feeder is referenced to the elements of Node and Branches classes through corresponding Node ID and Branch ID. The Model Builder function has two modes of execution: Initial Build and Incremental Update. Initial Build assumes that the Node, Branch, and auxiliary tables did not exist before and simply creates them. In Incremental Update mode, new network elements (lines, transformers, switches, and Injections) are added to the existing Node, Branch, and auxiliary tables.

Node, Branch, and NodeBranch Tables serve as input data for the Tracing function. Additional information comes from external interfaces: Feeder Head Busbar Energization and Switch Status. Both Feeder Head Busbar energization and Switch statuses may correspond to a study case and are identified by Case ID.

The Tracing function of Distribution Grid Management module 76 considers the switch statuses (opened/closed) and establishes the Node/Branch topological connectivity as an oriented graph relative to the supply sources—Feeder Head Busbar. It defines the Nodes and Branches topological references (connections to the Feeder Head Busbars, Feeder Heads, and supplying Branches). The Tracing function also sets Node Energization (if the Node is connected to the supply source), and the Branch's direction (orientation relatively to the supply source). Nodes and Branches directly connected to the Feeder Head Busbars Nodes have Supply Branch references equal to zero.

The Tracing function performs topology tracing starting from the supply source downstream, considering switch statuses (open/closed). In the one example implementation, it is assumed that the supply source is the Feeder Head Busbars—connection to the transmission system. In the presence of distributed generation and the possibility of using them as the only source of supply (transmission independent micro grid), the algorithmical solution described below can be modified. In one example implementation, the Tracing function creates two new tables: NodeTopology and BranchTopology. The NodeTopology table may include a case ID, an execution date, a node ID, an energization flag that is defined by the connection to the source of supply, a feeder head busbar node ID that indicates the source of supply, a feeder head node ID that is opposite the feeder head busbar node, and a supply branch ID, which is the first upstream branch if the topology is radial (a loop/parallel topology has two supply branches). The BranchTopology table may include a case ID, an execution date, a branch ID, a direction, a feeder head busbar node ID that indicates the source of supply, and a supply branch ID, which is the first upstream branch if the topology is radial.

Tracing starts from the Node (element of table "Node"), which serves a Feeder Head Busbar (FdHdBb). The FdHdBb Node is written in the list of Working Nodes—Nodes where tracing starts. On the first step of Tracing, the Working Nodes list contains FdHdBb Nodes only. For each Node from the Working Nodes list, the function goes through the list of all Branches connected to this Node. If the Branch is a line or a transformer, the opposite Node of this Branch is considered to be a candidate for the Working Node. If the Branch is a switch, the switch status (open/closed) should also be checked. The candidate for the Working Node only becomes a Working Node if it was not energized before. If the Node was energized before, the loop or parallel topology is found, and a warning message is generated.

As soon as the Node becomes a Working Node, the immediate upstream Branch connected to this Node is declared as a supply Branch and its ID is used both in the Node and Branch tables. After all Branches connected to the current Node are considered, the Node is deleted from the list of Working Nodes. Tracing is complete when the Working Node list becomes empty. In one example, topological functions described in this disclosure are used when DCM is used for distribution grid monitoring and not for DR/DER Management.

An Open Switch Function of Distribution Grid Management module 76 provides the Tracing for the part of the network connected to a switch that was closed initially, but now has been opened. If the Branch, representing the switch, had radial flow direction before (A to B or B to A), the downstream area becomes de-energized. The Upstream area is not affected. The de-energization for affected Nodes and Branches is modeled as follows: Direction is undefined, references FdHdBb Node ID, Feeder Head ID and Supply Branch ID are set to zero, Energization Flag is set to deenergized. If the switch was previously part of the loop or parallel connection, then areas from both sides of the switch become radial.

For some radial topology implementations, the open switch function of Distribution Grid Management module 76 is based on the same algorithm as Initial Tracing. It starts from the pre-selected Node (use switch Node that became de-energized), finds Branches and Nodes downstream, and sets their references and flags as described above. For some loop/parallel topology implementations, the open switch function of Distribution Grid Management module 76 finds supplying Feeder Head IDs for both switch Nodes, and provides Tracing from both Feeder Head Nodes.

The close switch function of Distribution Grid Management module 76 provides Tracing for the parts of the network immediately connected to a switch that was open initially, but now has been closed. If one switch Node was de-energized and another Node was also de-energized, the initially de-energized Node and connected area will now become energized and supplied radially. The function sets references FdHdBb Node ID, Feeder Head ID, and Supply Branch ID, and then sets Direction and Energization Flags.

For some radial topology implementations (one switch Node was deenergized before closing), the close switch function is based on the same algorithm as in Tracing. The close switch function starts from the switch Node that became energized as result of switch closing, and sets energization flags, direction, and topological references to the supplying Branch, Feeder Head Busbar, and Feeder Head for all Branches and Nodes downstream from this Node.

For some loop/parallel topology implementations (both switch Nodes were energized before closing). The close switch function provides the same functionality as Tracing for loop/parallel topology. The close switch function finds the supplying Feeder Head IDs of both sides of the loop and sets the Branch direction to loop/parallel.

The Select Subsystem Connected to the Desired FdHdBb Function of Distribution Grid Management module 76 selects all elements connected to the desired FdHdBb Node or Feeder Head Node. The selection procedure uses existing references from the Node/Branch to the Feeder Head Busbar and Feeder Head. The Select Subsystem Connected to the Desired FdHdBb function is used as a pre-processor for Load Flow when calculations for only one subsystem are required.

The Upstream Tracing Function of Distribution Grid Management module 76 provides Tracing from the selected element (Branch or Node) to the supplying FdHdBb. This function works on energized network only. In case of parallel topology, the tracing may lead to all connected FdHdBbs. There are two possible results of this Tracing: the FdHdBb ID (name) or a list of all the elements (Branches, Nodes, and Injections) on the path from the selected element until the FdHdBb (used for topological coloring). The function can be used together with Select Subsystem function if the desired subsystem is selected starting from any element, other than the Feeder Head or FdHdBb.

The Downstream Tracing Function of Distribution Grid Management module 76 identifies all network elements downstream from the selected element. This function only works on an energized network. For radial topology, the result of the Tracing is a list of all elements (Branches, Nodes, and Injections) supplied from the selected element. The solution is used for topological coloring and analysis of the Load Flow/DR flow solution. For example, if DR at the feeder head is distributed between phases asymmetrically, downstream tracing will help to find the sources of this asymmetry.

The Common Path Function of Distribution Grid Management module 76 finds a common supply path for two or more selected elements (typically used in an Outage Management System). In the case of an outage reported by AMI for a few customers, it is important to find the closest upstream protective device (fuse) that has tripped or melted and is likely the source of the outage.

The Node to Node Tracing Function of Distribution Grid Management module 76 identifies the all elements on the path from one selected Node to another selected Node.

The Flow Calculator function of Distribution Grid Management module 76 determines the branch flow values according to the grid topology and is based on injection values for the desired case or date and time. Branch flow values are calculated per phase. The calculator determines two sets of flow values for each branch or phase: Active power flow (based on power injections at the nodes) and Demand Response flow (based on DR values at the nodes). It is possible that only one set of flow values is calculated: Active Power or DR. DR flow may include the aggregated DR/DER value.

The Load Flow input data is originated from the tables described above: Node, Branch, NodeTopology, and BranchTopology. An additional source of data is the Injection Model table, which interfaces with the DR database and MDM database or CBL Load Schedule database. The Injection Model table may include a case ID, execution dates and times, the sum of a load or the sum of generation for each phase, and the DR on each phase.

The Load Flow Calculator solution may be written in the BranchFlow table. The BranchFlow table may include a case ID, execution date and time, a branch ID, load flow solutions for power, e.g., in kW, through the branch for each phase, and load flow solutions of aggregated DR, e.g. in kW, for each phase. DR flow, calculated for each Feeder Head Busbar (substation), is the topological aggregation of DR, providing values for each Node of the transmission or sub-transmission system. The Flow Calculator is executed for each subsystem, the part of the distribution grid connected to the same FdHdBb. It can also be executed for each feeder. If a solution is required for the entire grid, Flow Calculator solves subsystems one by one, moving through the list of all FdHdBbs.

Algorithmically, the Flow Calculator is based on a summation of injections through an oriented graph prepared by the Tracing function. The process starts at the injection nodes and moves upstream from the current level of supply branch to the next level branch until it reaches the supply source (FdHdBb Node). This process corresponds to the Forward Sweep of the radial power flow ladder technique.

The Flow Calculator also computes currents. Currents are calculated at the Nodes where voltages and power factors are known or can be estimated, typically at the Feeder Head Busbar or Feeder Head. The calculation results are written into the FeederFlow table. The FeederFlow table may include a case ID, execution date and time, feeder ID, the total phase current, and the total neutral current. This approach allows for simple yet accurate current calculations at critical points of the grid without the need to solve an accurate multiphase power flow. In this manner, currents are calculated without using impedances, which may be hard to collect.

Both the total three phase current and the neutral current are calculated at the Feeder Head and Feeder Head Busbar. Voltage at the Feeder Head Busbar is set by the substation transformer LTC (local controller) to 123128 V (in per unit based on a 120V base) and is typically known from the Distribution Grid operational practice. The power factor at the beginning of the feeder is close to unity (1-0.98) leading or lagging resulting from the requirements to compensate reactive power flow by switchable capacitors.

Total current of all three phases is calculated as:

$$I = (P_A + P_B + P_C)/(\sqrt{3} \cdot V \cdot \cos(\phi)) \quad (1)$$

The neutral current at the Feeder Head is calculated as:

$$I_{neutral} = \dot{I}_A + \dot{I}_B + \dot{I}_C \quad (2)$$

where
$\ddot{P}_A = S_A/(VoltA)$, $\ddot{P}_B = S_B/(VoltB)$, $\ddot{P}_C = S_C/(VoltC)$
VoltA=complex(1.0, 0.0)*Vph–g;
VoltB=complex(–0.5, –hsqrt3)*Vph–g;
VoltC=complex(–0.5, hsqrt3))*Vph–g;
hsqrt3=sqrt(3.0)*0.5;
S=P/cos($\phi$)
Q=$\sqrt{S^2 - P^2}$
S_complex=(P,Q)

Advanced functionality of Flow Calculator improves the accuracy of the Flow Calculator without solving full scale AC multiphase unbalanced Power Flow for a structurally asymmetrical distribution system. Advanced functionality for the Flow Calculator includes: 1) Power loss estimation including DR effect on power loss; and 2) Voltage estimation at the service and utilization points.

Distribution Grid Management module 76 also estimates power loss. Power loss estimation provides an approximate value of active power losses for each feeder as a sum of two components. The first component is feeder loading losses, which are a function of the feeder power flow. They can be calculated as a percentage of the feeder head active power flow (Loss-Factor). The typical value for Loss-Factor is about 7-8% of total power. The second component represents feeder no-load losses. They are calculated as a percentage (No-Load-Factor) of the sum of all distribution transformer ratings connected to the feeder. The value of the No-Load-Factor is determined by the average transformer susceptance value (0.4-0.5%).

Total loss estimation can be formulated as follows:

$$\Delta P = P_{feeder} \cdot \text{Load\_factor} + \Sigma S_{transformer}^{rating} \cdot \text{No\_Load\_factor} \quad (3)$$

DR affects power losses through a decrease in consumption, thereby reducing feeder losses. A decrease in feeder consumption produces smaller losses. By multiplying the DR value by the Load Factor, the decrease in losses due to DR activation can be calculated as follows:

$$\Delta P^{DR} = P^{DR} \cdot \text{Load\_Factor} \quad (4)$$

However, disconnecting or reducing consumption of the DR loads increases voltage, and therefore increases consumption of the remaining loads, such as constant impedance and constant current loads, and increases no-load losses.

Distribution grid management module 76 also provides voltage estimation. In the absence of accurate power flow, voltages are estimated. Voltage estimation at the service and utilization points is based on the distribution grid design guidelines and standards, which dictate voltage drops under maximum loading conditions. On a 120 volt base, it is usually assumed that there will be a one Volt drop through the service point, a two Volt drop through the secondary, and a three Volt drop through the transformer. Since the acceptable low voltage at the customer's meter is 114 Volts (ANSI standard), it is required that the input voltage to the transformer is not less than 120 Volts. Voltages on the primary distribution must lie between 126 and 120 Volts.

Voltage drop under loading conditions other than the maximum are estimated based on the ratio of the current distribution transformer loading to the distribution transformer rating:

$$\Delta V = \Delta V_{max} \frac{P_{transformer}}{\cos(\varphi) S_{rating}} \quad (5)$$

where $\Delta V_{max} = 6$ Volts. Service/utilization voltages through voltage drop are calculated as:

$$V = V_{primary} - \Delta V \quad (6)$$

Based on the branch flow values calculated as described above, the Flow Calculator functionality of distribution grid management module 76 can be extended to monitor distribution grid constraints. There are at least two possible scenarios where this functionality can be applied. In the first scenario, the monitoring constraints are related only to a DR event-DR event validation. Distribution grid management module 76 is not only used for identifying violations, but also serves as a congestion management tool. DR values are modified, preventing possible violations using study mode iterative executions.

The second scenario is where the customer uses DCM to monitor grid conditions independently from the existence or occurrence of DR events. In this case, DCM is executed on demand and in study mode, as in the previous scenario, but also periodically and in trigger mode following changes in topology or significant increases or decreases in consumption. This case also includes potential problems related to DERs connected to the distribution grid, such as small solar, wind, storage devices.

As indicated above, the techniques of this disclosure provide DR Event Validation. Two main areas of DR and distribution grid mutual influence that may lead to the grid violations are: cold load pick up before or after DR event and asymmetric DR balancing between phases. Cold Load Pick Up (CLPU) is the increase in consumption caused by DR participating loads not returning to their original level of consumption and consuming more than before. Its effect can be felt from minutes to hours.

The CLPU has four stages: 1) inrush current, 2) motor starting current, 3) motor running current, and 4) enduring demand. The first three stages are transient and generally last for about a few tenths of a second, which is still comparable to the time delay of the feeder head over current protection. The load increase during these stages can be about 3-15 times the normal load. The enduring demand stage lasts for a few hours until the normal diversity among the loads is regained. The load increase at the start of this last stage is still up to 2 to 5 times the load that was originally shed.

Following the description above, the CLPU simulation may use a factor(s) on which the DR value should be multiplied to represent the increase in demand. If DR release is scheduled in stages a few minutes apart on the feeder base, the whole transient part of the CLPU can be neglected. However, if the entire feeder DR is released at the same time, the transient part is simulated. An accurate approach requires the transient increase factor to be associated with each individual consumer. If an accurate approach is not required, estimation can be based on one value per lateral, feeder, substation, or the entire power system. The enduring demand factor is always taken into account in CLPU simulation. It can be set per feeder, substation, or the whole power system.

The feeder head active power flow, calculated at the time of DR release with CLPU simulation, is used for determining current according to equation (1). This current value is limited by the feeder head Circuit Breaker protection limits that are typically about 400 amps (A) for long-term and about 600 A as a peak.

Regarding DR Balancing Between Phases, imbalanced DR distribution between phases leads to the increase in feeder head neutral current. This current is limited by the setting of the neutral wire overcurrent protection, typically about 70 A. Therefore, feeder head current calculated at the time of DR activation should include DR values for each phase. This current is recalculated in the neutral wire current using equation (2) above, which is compared against the overcurrent protection limit.

DCM provided by distribution grid management module 76 may also monitor grid loading conditions. In this mode of operation, DCM is running near in real-time using the latest AMI measurements and current switch statuses. It is executed periodically in trigger mode (switch change status) and on demand. The Load Flow solution is checked against loading and voltage violations. Presence of DER can create overloads due to reversed flow and high voltage violations.

DCM provided by distribution grid management module 76 also may provide DR through voltage reduction. DR (load reduction) through voltage regulation is accomplished by decreasing customer utilization voltage. The decrease in utilization voltage causes constant current and constant impedance loads, which consume less power. Voltage reduction also decreases transformer no-load losses. However, it does not affect constant power loads, and may lead to an increase in loading losses. For an average mixed residential, commercial, and industrial load, stat 1% of voltage reduction decreases consumed power consumption by approximately 1% and energy consumption by 0.5%.

The voltage regulation devices that are used to control voltage in real-time are Load Tap Changer (LTC) transformers and Line (step) Voltage Regulators (LVR). These devices can be controlled directly by changing tap position or indirectly through local controllers. In the latter case, the change affects the local controller set point.

Another type of device that significantly affects voltages is switchable capacitors. They are not used for direct voltage regulation, but their presence is always taken into account in voltage regulation.

There are two main issues in any system implementing DR through Voltage Reduction: 1) Voltage reduction range—how much can voltage be reduced on any particular LTC/LVR without violating any limit?; and 2) How much power (energy) can be saved for a 1% voltage reduction.

Regarding voltage reduction range, the range of voltage regulation is determined by the ANSI Standard that provides a range of Normal Steady-State voltages (Range A) and a range of Emergency Steady-State voltages (Range B) to be supplied to all customers. The critical boundary for voltage reduction is minimum service voltage and minimum utilization voltage, which can easily be violated. For Range A the minimum service voltage is 114 V and the minimum utilization voltage is 110 V.

Another part of the ANSI Standard deals with voltage imbalance. It is recommended that the feeder should be regulated in such a way that the voltage imbalance at three phase loads does not exceed 3%. There are at least two possible approaches for determining the voltage regulation range. The traditional approach is based on study mode power flow calculations when each LTC/LVR regulation zone is accurately simulated during peak loading conditions (expected DR time).

The second approach takes advantage of the modern AMI. Some AMI meters provide voltage data information that can be collected every five minutes. This allows the service voltage to be monitored in almost real-time. The main idea of this second approach is to algorithmically connect each LTC/LVR used for voltage regulation to the corresponding AMI meters with voltage measurements, which can be read within a short period of time (for example bell-weather meters configure to almost real-time reading). These meters should be strategically located in each LTC/LVR regulating zone, in the areas with the highest voltage drops from the voltage regulated buses to the service points By monitoring AMI voltage measurements and responding to the change of LTC/LVR regulated voltage, each regulated zone can be safely moved to the lowest acceptable voltage. It should be noted that it may be desirable to perform a preparation study prior to the DR/Voltage Reduction system is activated. For example, after initial activation and monitoring of AMI voltage measurements, some LTC/LVR may not have any room for voltage reduction. Their service point voltages are at the minimal ANSI values or lower. In this case, the distribution transformer no-load tap changers should be checked and tuned properly (typically 3 or 5 steps—2.5% each).

The relation between LTC/LVR and connected AMI meters is not constant, but changes dynamically as feeder topology changes. For example, if the closed switch is opened and the opened switch is closed in FIG. 2, LVR 2 will depend on some meters currently connected to LVR 1 (assuming the LVR 2 has reversed the mode of regulation). For LVR with independent phase regulation, it is also important to correctly determine the phase connection of the AMI meter.

The voltage reduction should be executed in small incremental steps where the step accuracy can be confirmed by the newly collected voltage measurements. An important issue of the implementation is LTC/LVR behavior in case of failures (e.g., communication, hardware, software). Voltage reduction may move tap positions to area position where they may not be kept for a long period of time. If implementation is done through local controller or direct control of tap positions, this check can be done by blocking the local controller. The controller's "heartbeat" functionality guarantees a safe return to the default setpoint value. However, direct control over tap position in the absence of a local controller does not provide a similar protective mechanism.

Another potential problem is related to LVRs with independent phase regulation. These LVRs may increase voltage imbalance. In order to prevent this, it is required that LVR output voltage have voltage imbalance limited to 0.3% if there are three phase loads supplied from the LVR regulating zone.

The effectiveness of DR through voltage regulation depends on the structure of customers (residential, industrial, commercial, etc.) in each regulation zone. The customer's structure defines which devices are consuming energy and their dependency on voltage. Constant active/reactive power devices (synchronous motors) do not respond to voltage change. Only constant active power devices (asynchronous motors) have very little response to voltage. Voltage reductions, applied to such consumers, only cause an increase in loading power losses. At the same time, power consumption of constant impedance devices (lighting) depends on voltage to the power of two and also decrease power losses. This qualitative analysis allows the user to roughly determine how effective voltage reduction would be, however cannot determine the exact values. The accurate estimation comes from monitoring the power response to voltage reduction on the corresponding transformer LTC/LVR.

The solution to DR through Voltage Regulation described above may also be implemented using webDistribute. The solution is implemented through interaction with three other distribution grid functions: Meter Data Management (MDM), GIS and SCADA. MDM provides AMI voltage measurements. GIS is the source of topology information, statuses of not remotely controlled switches and the connection of AMI voltage measurements to the distribution transformers.

The SCADA interface is bidirectional. SCADA provides statuses of remotely controlled switches, RTU measurements of voltages, LTC/LVR voltage regulation set points, tap positions, and flow measurements through controlled LTC/LVR. SCADA also implements the OAT1 webDistribute solution by changing LTC/LVR local controllers' set points or tap positions.

webDistribute may be executed in a closed loop mode running periodically with a time interval of a few minutes, the time required for changing LTC position and collecting SCADA confirmation on execution (failure) of each involved LTC/LVR set point, and receiving the updated measurements from both MDM (AMI voltages) and SCADA. Through SCADA, webDistribute also supports local controllers "heartbeat" functionality by sending a periodical signal to keep current set points and not allowing them to return to the default values.

DCM User Interface may be presented in two forms: output tables and schematic (maps) diagrams. Load Flow output tables represent each Branch flow per phase as two sets of data: active power and DR values.

Figure 8:
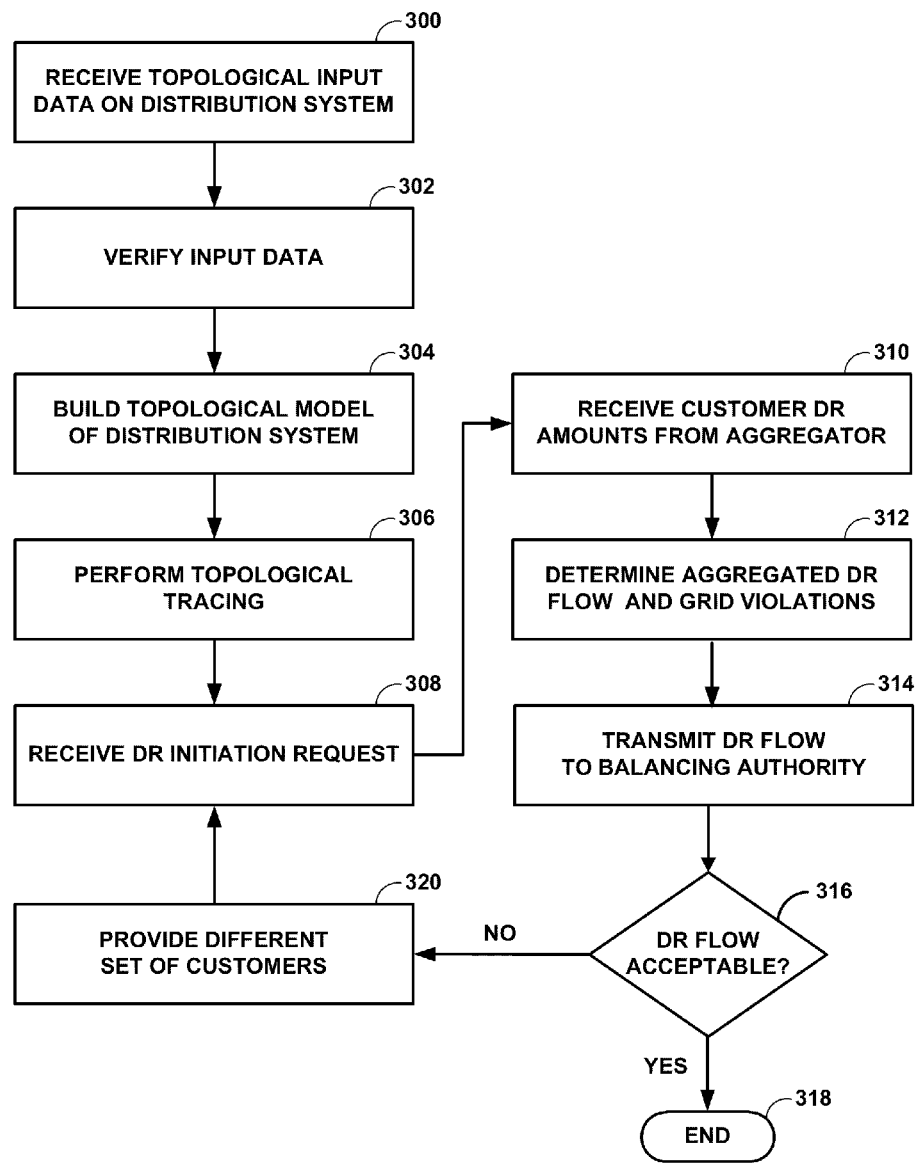
FIG. 8 is a flow diagram illustrating another example implementation of distribution network analysis in the DR scheduling process, in accordance with this disclosure.

FIG. 8 is a flow diagram illustrating another example implementation of distribution network analysis in the DR scheduling process, in accordance with this disclosure. In FIG. 8, distribution grid management module 76 receives topological input data on the distribution system in order to create a Distribution System Topological Model (DSTM) (300). As described above, DSTM input data are lines, transformers, and switches—actual elements of the distribution network. In some examples, after receiving the topological input data on the distribution system, distribution grid management module 76 verifies the input data (302). For example, distribution grid management module 76 may use the data checker function described above to verify that the input data is correct. Next, distribution grid management module 76 builds, or determines, a topological model of the distribution system (304). For example, distribution grid management module 76 may use the model builder function to determine the topological model. Steps 300-304 may be considered to be static in that the topological model of the distribution system does not change dynamically. For example, new transformers and feeders are not added frequently to the distribution system.

After distribution grid management module 76 creates the topological model, distribution grid management module 76 performs topological tracing of the distribution system periodically, e.g., every fifteen minutes, to determine switch statuses (306). For example, distribution grid management module 76 may use the tracing function to perform the topological tracing. Distribution grid management module 76 then receives a DR initiation request, e.g., balancing authority 100 (308). For example, an ISO make request a demand reduction of 5 MW. It should be noted that in some example implementations, the DR initiation request is received prior to the topological tracing shown at 306, due to the fact that the tracing is being performed on a periodic basis.

After receiving the DR initiation request, distribution grid management module 76 transmits the request to an aggregator, e.g., aggregator 102 of FIG. 6, and in response receives customer location information and customer DR amounts from the aggregator (310). For example, distribution grid management module 76 may receive information indicating what node each customer is electrically connected and the DR value (in kW, for example) that each customer can provide in terms of DR. In some examples, it is at this point that the aggregator turns off or others adjusts customer equipment participating in a DR program. Using the previously built DSTM model and tracing information, distribution grid management module 76 determines aggregated DR flow and any grid violations, e.g., cold load pickup issues or phase imbalances (312). Distribution grid management module 76, via server 30, transmits the aggregated DR flow per electric node, e.g., substation, substation busbar, feeder, lateral, and the like, to the balancing authority, for example (314). Again, the balancing authority wants to know the aggregated DR flow per electric node because the price of delivering energy is determined at each electric node, e.g., substation or feeder. Also, the balancing authority may want to know the aggregated DR flow per electric node for reliability reasons.

Once the balancing authority receives the aggregate DR flow per electric node from distribution grid management module 76, via server 30, the balancing authority determines if the DR flow is acceptable (316). The DR flow may be unacceptable due to violations, e.g., cold load pickup issues or imbalances, or it may be unacceptable because not enough load has been shed. If the balancing authority determines that the DR flow is acceptable ("YES" branch of 316), then DR request procedure is complete (318). If the balancing authority determines that the DR flow is not acceptable ("NO" branch of 316), then the balancing authority may request the DR aggregator to provide a different set of customers to resolve the violation (320) and/or submit another DR initiation request, which is received by distribution grid management module 76, via server 30 (308). It should be noted that acts 300-312 generally correspond to flow lines "1"–"5" in FIG. 2 and act 314 generally corresponds to flow line "6" in FIG. 2. It should be understood that any of the methods shown and described above may be implemented, at least in part, by server 30 and in particular by processor 32.

In this manner, the dispatchable DR management systems and methods described in this disclosure integrate DR with distribution grid topology, which allows transmission and distribution operators to consider the impact of DR in the distribution grid and to determine DR availability at the transmission nodes. The result of the proposed DR topological aggregation is the true value of the demand decrease calculated per substation and feeder. The DR values per electric node, e.g., substation, substation busbar, feeder, lateral, and the like, are reported back to ISO/RTO, used for scheduling, and serve as targets for DR real-time monitoring. DR values aggregated per feeder/phase or any other grid element are available to the distribution system operators and are used to prevent possible violations such as load pickup before and after a DR event, lack of coordination between DR and distribution grid volt/VAR control, and asymmetric DR balancing between phases.

Various aspects of the disclosure have been described. These and other aspects are within the scope of the following claims.

The invention claimed is:

1. A method comprising:
   receiving a demand response (DR) request from a DR initiator, initiating the planning of a DR event, in an electric distribution grid having a plurality of electric nodes and a plurality of customers;
   transmitting the DR request to an aggregation service provider;
   for each customer, receiving customer location information and a customer DR value from the aggregation service provider;
   aggregating DR at a distribution transformer in a distribution system by determining topologically where each customer is located;
   determining if there are any violations in the distribution system;
   determining an aggregated DR value for each electric node affected by the DR request; and
   transmitting each aggregated DR value to the DR initiator.

2. The method of claim 1, wherein at least one electric node is a sub station.

3. The method of claim 1, wherein the electric node is a feeder.

4. The method of claim 1, further comprising:
   aggregating by mapping customer meters/service points with a model of the grid topology.

5. The method of claim 4, wherein determining a topological model of the distribution system comprises:
   receiving topological input data on the distribution system;
   verifying the input data; and
   determining a plurality of nodes on the distribution system and a plurality of branches on the distribution system, and determining connections between the plurality of nodes and the plurality of branches.

6. The method of claim 1, further comprising:
   determining a status of at least one switch on the distribution system.

7. The method of claim 1 further comprising:
   determining at least one violation on the distribution system based on the aggregated DR value associated with a respective electric node affected by the DR request.

8. The method of claim 7, wherein the at least one violation is related to cold load pickup.

9. The method of claim 7, wherein the at least one violation is related to asymmetric DR balancing between phases.

10. A system having a computer, including a memory containing instructions that, when executed by a processor, cause the processor to:
    receive a demand response (DR) request from a DR initiator, initiating the planning of a DR event, in an electric distribution grid having a plurality of electric nodes and a plurality of customers;
    transmit the DR request to an aggregation service provider;
    for each customer, receive customer location information and a customer DR value from the aggregation service provider;
    aggregate DR at a distribution transformer in a distribution system by determining topologically where each customer is located;
    determine if there are any violations in the distribution system;
    determine an aggregated DR value for each electric node affected by the DR request; and
    transmit each aggregated DR value to the DR initiator.

11. The system of claim 10, wherein at least one electric node is a sub station.

12. The system of claim 10, wherein at least one electric node is a feeder.

13. The system of claim 10, further comprising instructions that, when executed by a processor, cause the processor to:
    aggregate by mapping customer meters/service points with a model of the grid topology.

14. The system of claim 13, wherein the instructions that cause the processor to determine a topological model of the distribution system further comprise instructions that, when executed by a processor, cause the processor to:
    receive topological input data on the distribution system;
    verify the input data; and
    determine a plurality of nodes on the distribution system and a plurality of branches on the distribution system, and determining connections between the plurality of nodes and the plurality of branches.

15. The system of claim 10, further comprising instructions that, when executed by a processor, cause the processor to:
    determine a status of at least one switch on the distribution system.

16. The system of claim 10, further comprising instructions that, when executed by a processor, cause the processor to:
 determine at least one violation on the distribution system based on the aggregated DR value associated with a respective electric node affected by the DR request.

17. The system of claim 16, wherein the at least one violation is related to cold load pickup.

18. The system of claim 16, wherein the at least one violation is related to asymmetric DR balancing between phases.

19. A system comprising:
 means for receiving a demand response (DR) request from a DR initiator, initiating the planning of a DR event, in an electric distribution grid having a plurality of electric nodes and a plurality of customers;
 means for transmitting the DR request to an aggregation service provider;
 for each customer, means for receiving customer location information and a customer DR value from the aggregation service provider;
 means for aggregating DR at a distribution transformer in a distribution system by determining topologically where each customer is located;
 means for determining if there are any violations in the distribution system;
 means for determining an aggregated DR value for each electric node affected by the DR request; and
 means for transmitting each aggregated DR value to the DR initiator.

* * * * *